United States Patent
Song et al.

(10) Patent No.: US 11,823,804 B2
(45) Date of Patent: Nov. 21, 2023

(54) STEAM GENERATOR ACCIDENT MITIGATION SYSTEM

(71) Applicant: KOREA ATOMIC ENERGY RESEARCH INSTITUTE, Daejeon (KR)

(72) Inventors: Jin-Ho Song, Asan-si (KR); Kwang Soon Ha, Daejeon (KR); Byeonghee Lee, Daejeon (KR); Sung Il Kim, Daejeon (KR); Yong Mann Song, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 201 days.

(21) Appl. No.: 17/121,873

(22) Filed: Dec. 15, 2020

(65) Prior Publication Data

US 2021/0313082 A1 Oct. 7, 2021

(30) Foreign Application Priority Data

Apr. 1, 2020 (KR) ........................ 10-2020-0039844

(51) Int. Cl.
*G21C 15/18* (2006.01)
*G21D 3/04* (2006.01)
(Continued)

(52) U.S. Cl.
CPC ............. *G21C 15/18* (2013.01); *G21C 9/022* (2013.01); *G21C 15/12* (2013.01); *G21D 3/04* (2013.01)

(58) Field of Classification Search
CPC ........... G21C 15/12; G21C 15/18; G21D 3/04
See application file for complete search history.

(56) References Cited

U.S. PATENT DOCUMENTS 4,261,300 A * 4/1981 Cross ................... F22B 37/483
122/406.1
5,120,490 A * 6/1992 Koshiishi ............... G21C 15/18
376/282
(Continued)

FOREIGN PATENT DOCUMENTS

CN 104733060 A * 6/2015
CN 110534214 A * 12/2019
(Continued)

OTHER PUBLICATIONS

JP09304584A.*
Korean Office Action dated Jul. 29, 2021 issued in corresponding Korean Patent Application No. 10-2020-0039844.

*Primary Examiner* — Lily C Garner
(74) *Attorney, Agent, or Firm* — Harness, Dickey & Pierce, P.L.C.

(57) ABSTRACT

A steam generator accident mitigation system is disclosed. A steam generator accident mitigation system to mitigate an accident if the accident occurs in a steam generator installed inside a containment building of a nuclear power plant according to an exemplary embodiment of the present system, the system including: a pressurizing tank which is installed inside the containment building and includes a first cooling water and a non-condensable gas for pressurizing the first cooling water therein; at least one connecting pipe connecting the steam generator and the pressurizing tank; and at least one connecting pipe valve which is installed in the at least one connecting pipe, respectively, and is able to control the amount of opening of the connecting pipe; wherein opening of the at least one connecting pipe valve permits fluid communication between the steam generator and the pressurizing tank.

5 Claims, 6 Drawing Sheets

(51) Int. Cl.
  *G21C 15/12* (2006.01)
  *G21C 9/02* (2006.01)

(56) References Cited

U.S. PATENT DOCUMENTS

| | | | | |
|---|---|---|---|---|
| 5,309,487 | A * | 5/1994 | McDermott | G21D 3/04 |
| | | | | 376/250 |
| 5,761,262 | A * | 6/1998 | No | G21C 9/012 |
| | | | | 376/283 |
| 9,905,320 | B2 * | 2/2018 | Kim | G21C 1/32 |
| 10,325,688 | B2 * | 6/2019 | Kim | G21C 15/18 |
| 10,366,796 | B2 * | 7/2019 | Laborda Rami | G21D 3/06 |
| 11,355,255 | B2 * | 6/2022 | Park | G21C 15/18 |
| 11,646,123 | B2 * | 5/2023 | Kim | G21D 1/02 |
| | | | | 376/282 |
| 2009/0116607 | A1 | 5/2009 | Song et al. | |
| 2012/0263268 | A1 | 10/2012 | Kwon et al. | |
| 2013/0070887 | A1 | 3/2013 | Kim et al. | |
| 2013/0202075 | A1 | 8/2013 | Kwon et al. | |
| 2014/0050292 | A1 * | 2/2014 | Kim | G21C 1/32 |
| | | | | 376/282 |
| 2014/0219409 | A1 | 8/2014 | Kim et al. | |
| 2014/0226778 | A1 | 8/2014 | Kim et al. | |
| 2014/0334590 | A1 | 11/2014 | Kim et al. | |
| 2014/0334591 | A1 | 11/2014 | Kim et al. | |
| 2015/0243383 | A1 | 8/2015 | Kwon et al. | |
| 2016/0109185 | A1 * | 4/2016 | Middleton | F28D 20/0039 |
| | | | | 376/277 |
| 2016/0247585 | A1 | 8/2016 | Han et al. | |
| 2016/0322121 | A1 | 11/2016 | Kim et al. | |
| 2017/0004892 | A1 | 1/2017 | Kim et al. | |
| 2017/0133111 | A1 * | 5/2017 | Laborda Rami | G21C 15/18 |
| 2017/0148533 | A1 | 5/2017 | Kim et al. | |
| 2017/0263340 | A1 | 9/2017 | Kim et al. | |
| 2018/0233240 | A1 | 8/2018 | Kim et al. | |
| 2018/0261342 | A1 | 9/2018 | Kim et al. | |
| 2018/0308592 | A1 | 10/2018 | Kim et al. | |
| 2020/0035232 | A1 | 1/2020 | Garcia | |
| 2020/0072087 | A1 | 3/2020 | Kim et al. | |
| 2020/0126680 | A1 | 4/2020 | Kim et al. | |
| 2020/0141351 | A1 | 5/2020 | Kim et al. | |
| 2020/0161011 | A1 | 5/2020 | Kim et al. | |
| 2020/0234835 | A1 | 7/2020 | Lee et al. | |
| 2020/0234836 | A1 | 7/2020 | Park et al. | |
| 2020/0273589 | A1 | 8/2020 | Kang et al. | |

FOREIGN PATENT DOCUMENTS

| | | | | |
|---|---|---|---|---|
| CN | 110911024 | A * | 3/2020 | |
| CN | 113255246 | A * | 8/2021 | |
| JP | 11211886 | A * | 8/1999 | |
| JP | 2018-151355 | A | 9/2018 | |
| KR | 20140018670 | A * | 2/2014 | G21C 15/18 |
| KR | 101441488 | B1 * | 9/2014 | |
| KR | 10-1559017 | B1 | 10/2015 | |
| KR | 101559017 | B1 * | 10/2015 | |
| KR | 101785460 | B1 * | 10/2017 | |
| KR | 102020908 | B1 * | 9/2019 | |
| KR | 102072689 | B1 * | 2/2020 | |
| KR | 102136366 | B1 * | 7/2020 | |

* cited by examiner

STEAM GENERATOR ACCIDENT MITIGATION SYSTEM

CROSS-REFERENCE TO RELATED APPLICATION

This application claims priority to South Korean Patent Application No. 10-2020-0039844, filed on Apr. 1, 2020, which is incorporated by reference herein.

FIELD

The present invention relates to a steam generator accident mitigation system, and more particularly, to a steam generator accident mitigation system installed inside a containment building.

BACKGROUND

In the current design of pressurized light water reactors, if a steam generator tube rupture accident occurs, an atmospheric dump valve or a safety valve of the steam generator on the rupture side is opened or a severe accident proceeds and a main steam pipe safety valve is stuck opened, thus radioactive materials are released directly into the atmosphere. In particular, if the steam generator tube rupture accident develops to a severe accident accompanied by core damage, it may lead to a severe accident in which a large amount of radioactive materials generated by the core damage are released directly into the atmosphere.

However, the current technology for preventing or mitigating this is limited to the management of damage to the steam generator U-tubes during normal operation, emergency response procedures, and severe accident management strategy, etc. In other words, there is a great shortage of coping facilities and technology to actively cope with steam generator tube rupture accident. That is, no technology has been proposed to suppress the release of radioactive materials into the outside of the containment building at the time of steam generator tube rupture.

In addition, an accident may occur in which the pressure of the steam generator increases or decreases due to various causes. Therefore, a system is needed to control the pressure of the steam generator. However, most of the systems currently installed in nuclear reactors have a problem in that they emit steam into the atmosphere, causing radioactive materials to be released into the environment.

SUMMARY

According to one embodiment of the present invention, it is intended to provide a steam generator accident mitigation system that allows flow from the steam generator to a separate space inside the containment building if a high pressure coolant of a nuclear reactor system is introduced into the steam generator due to steam generator tube rupture accident or if the pressure of the steam generator increases due to another accident. According to one embodiment of the present invention, it is intended to provide a steam generator accident mitigation system that can limit the range of release of radioactive materials just into the containment building in the event of steam generator tube rupture accident.

According to one aspect of the present invention, a steam generator accident mitigation system is provided to mitigate an accident if the accident occurs in a steam generator installed inside a containment building of a nuclear power plant, the system comprising: a pressurizing tank which is installed inside the containment building and comprises a first cooling water and a non-condensable gas for pressurizing the first cooling water therein; at least one connecting pipe connecting the steam generator and the pressurizing tank; and at least one connecting pipe valve which is installed in the at least one connecting pipe, respectively, and is able to control the amount of opening of the connecting pipe; wherein opening of the at least one connecting pipe valve permits fluid communication between the steam generator and the pressurizing tank. In this case, the at least one connecting pipe includes a first connecting pipe and a second connecting pipe; wherein the first connecting pipe is installed on the upper portion of the steam generator, and the first cooling water in the pressurizing tank or steam generated from the steam generator can flow through the first connecting pipe, and the second connecting pipe is installed on the lower portion than the first connecting pipe, and the first cooling water in the pressurizing tank or a second cooling water in the steam generator can flow through the second connecting pipe.

In this case, in case the pressure inside the steam generator increases due to accidents, the second cooling water or the steam may be configured to move from the steam generator to the pressurizing tank by a pressure difference. In this case, the second cooling water or the steam may be configured to move from the steam generator to the pressurizing tank if steam generator tube is ruptured. In this case, the first cooling water may be configured to move from the pressurizing tank to the steam generator when the pressure inside the steam generator suddenly decreases.

In this case, a first safety valve is installed on one end of the pressurizing tank outside, and at least some of steam introduced from the steam generator into the pressurizing tank may be configured to be released inside the containment building through the first safety valve. In this case, the first safety valve may be configured to release steam introduced from the steam generator when the pressure of the first safety valve is lower than that of a main steam pipe safety valve installed on a main steam pipe connecting the steam generator and a turbine.

Steam emitted from the pressurizing tank may be moved to an enclosed space located inside the containment building through a passive autocatalytic recombiner. In this case, the connecting pipe valve may be configured to be operated manually. In this case, maximum capacity of steam flowing through the connecting pipe valve may be 5% of full power steam amount of the steam generator. In this case, any one end of the at least one connecting pipe may be connected to the main steam pipe connected to the steam generator and the other end may be connected to the outside of the pressurizing tank. In this case, the at least one connecting pipe may mean a single connecting pipe.

According to one embodiment of the present invention, a steam generator accident mitigation system installed inside a containment building introduces a pressurizing tank capable of fluid communication with a steam generator, allowing flow from the steam generator to the pressurizing tank if a high pressure coolant of a nuclear reactor system is introduced into the steam generator due to steam generator tube rupture accident or if the pressure of the steam generator increases due to another accident. A steam generator accident mitigation system according to another embodiment of the present invention may suppress radioactive materials from being released into outside environment by releasing radioactive materials introduced from a nuclear reactor into the pressurizing tank in the containment building and the containment building itself.

BRIEF DESCRIPTION OF DRAWINGS

The above and other objects, features, and advantages of the present invention will become more apparent to those of ordinary skill in the art by describing exemplary embodiments thereof in detail with reference to the accompanying drawings, in which.

DETAILED DESCRIPTION

Hereinafter, exemplary embodiments of the present invention will be described in detail so that those of ordinary skill in the art can readily implement the present invention. The present invention may be embodied in many different forms and are not limited to the embodiments set forth herein. In the drawings, parts unrelated to the description are omitted for clarity. Throughout the specification, like reference numerals denote like elements. It is understood that the terms "comprise" or "have" when used in this specification, are intended to specify the presence of stated features, integers, steps, operations, members, components and/or a combination thereof but not preclude the possibility of the presence or addition of one or more other features, integers, steps, operations, members, components, or a combination thereof.

Figure 1:
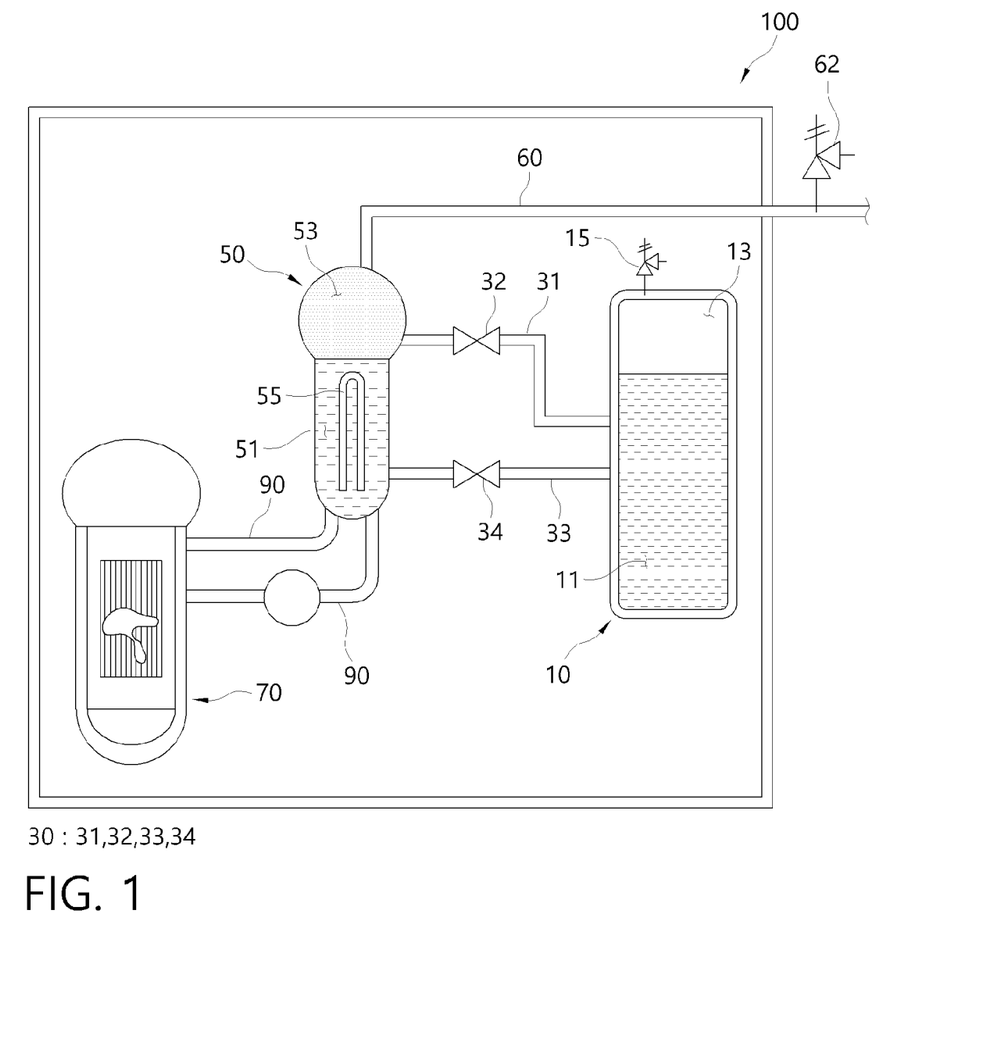
FIG. 1 is a block diagram illustrating a containment building of a nuclear power plant in which a steam generator accident mitigation system is installed according to an exemplary embodiment of the present invention.
Figure 2:
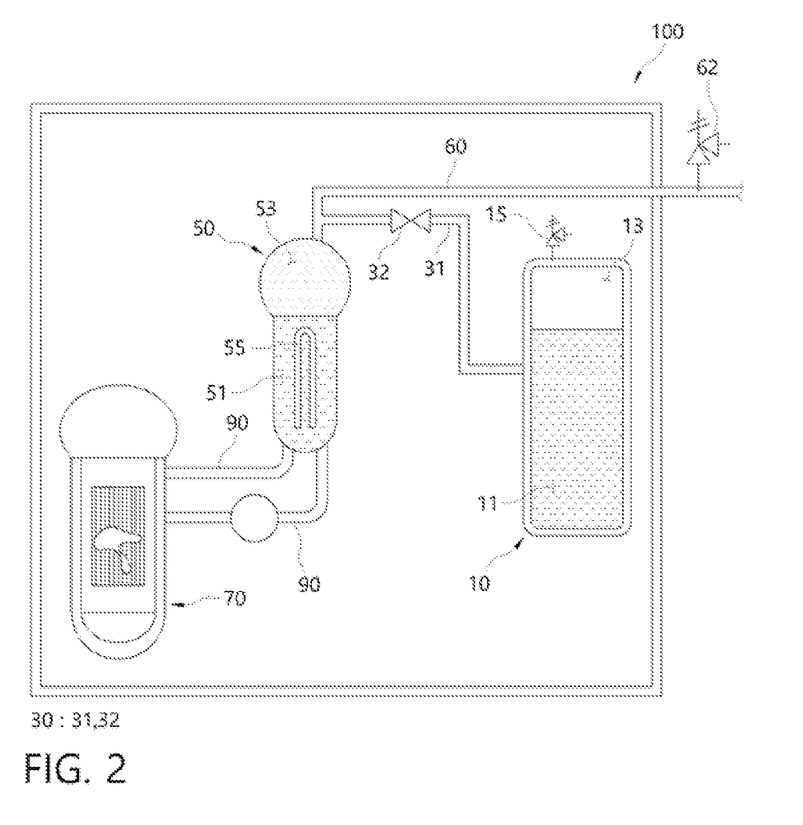
FIG. 2 is a block diagram illustrating a steam generator accident mitigation system where one end of a connecting pipe is connected to a main steam pipe according to an exemplary embodiment of the present invention.
Figure 3:
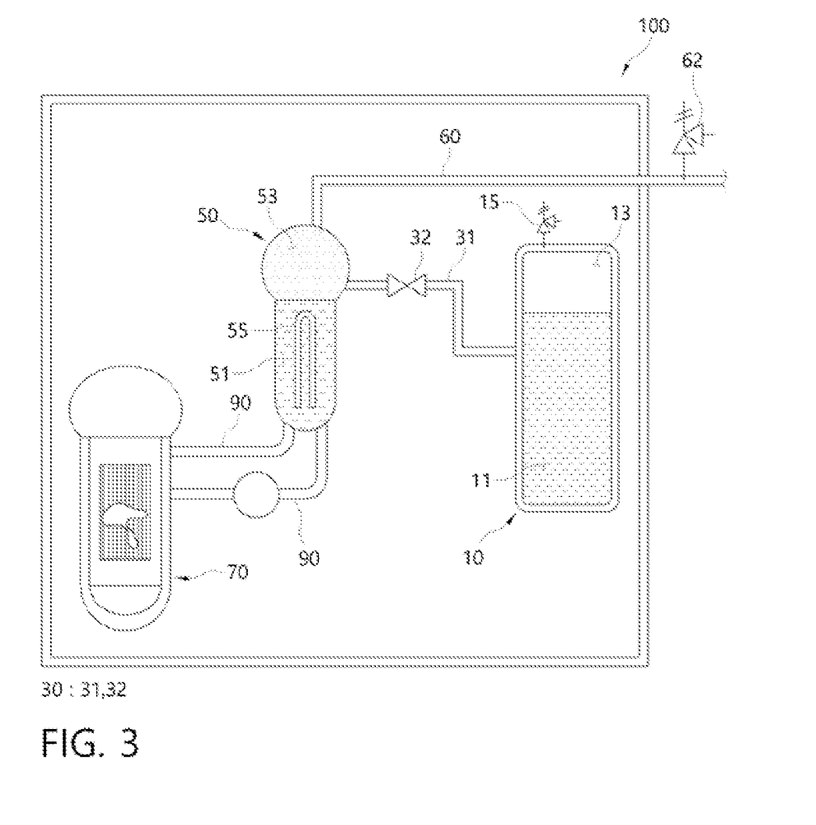
FIG. 3 is a block diagram illustrating a steam generator accident mitigation system where a steam generator and a pressurizing tank can be connected by a single connecting pipe according to an exemplary embodiment of the present invention.

FIG. 1 is a block diagram illustrating a containment building of a nuclear power plant in which a steam generator accident mitigation system is installed according to an exemplary embodiment of the present invention. FIG. 2 is a block diagram illustrating a steam generator accident mitigation system where one end of a connecting pipe is connected to a main steam pipe according to an exemplary embodiment of the present invention. FIG. 3 is a block diagram illustrating a steam generator accident mitigation system where a steam generator and a pressurizing tank can be connected by a single connecting pipe according to an exemplary embodiment of the present invention.

A steam generator accident mitigation system 1 according to one embodiment of the present invention is designed to properly cope with, for example, an accident related to the steam generator 50 in a nuclear power plant, such as a rupture of a tube 55 of the steam generator 50 accompanied by core damage so that the radioactive material does not spread into the atmosphere. Specifically, a steam generator tube 55 is located inside the steam generator 50 installed in a containment building 100 of a nuclear power plant, and a coolant introduced along the cooling system 90 can flow through the tube 55 after receiving heat energy from a nuclear reactor 70. In this case, the coolant flowing through the tube 55 inside the steam generator 50 can exchange heat with a second cooling water 51 around the tube 55. As a result of such heat exchange, a part of the second cooling water 51 may be vaporized and exist in a vapor state in a space located above the second cooling water 51, and a part of the second cooling water 51 may be moved to a turbine along the main steam pipe 60.

However, for example, if an accident such as rupture of tube 55 occurs, a large amount of radioactive materials may be moved through the main steam pipe 60, and in case a main steam pipe safety valve 62 is opened the radioactive materials may be released into the external atmosphere. In this case, the location or number of the rupture of the tube is not limited in the steam generator tube rupture accident. In addition, the steam generator tube rupture accident may or may not be accompanied by core damage. In this regard, the steam generator accident mitigation system 1 according to one embodiment of the present invention is able to prevent steam containing a large amount of radioactive materials from being released to the outside of the containment building 100 through the main steam pipe safety valve 62 by inducing steam 53 or the second cooling water 51 to move to a pressurized tank 10 connected to the steam generator 50.

Referring to FIG. 1, a steam generator accident mitigation system 1 according to one embodiment of the present invention may comprise a pressurizing tank 10 and one or more connecting pipes 30. In one embodiment of the present invention, the pressurizing tank 10 may be installed inside the containment building 100, and a space may be formed for storing fluid therein. In this case, a first cooling water 11 may be present in the internal space of the pressurizing tank 10. Here, the first cooling water 11 is a fluid in a liquid state and may be moved toward the steam generator 50 through the connecting pipe 30 described later in the event of a severe accident. However, the description related to the movement of the first cooling water 11 will be described in detail through the corresponding part.

And, in addition to the first cooling water 11, a non-condensable gas 13 may be present in the internal space of the pressurizing tank 10. Here, the non-condensable gas 13 may mean a gas that cannot be changed into a condensed phase only by increasing the pressure. For example, the non-condensable gas 13 may be air or nitrogen ($N_2$). In one embodiment of the present invention, the non-condensable gas 13 may be located above the first cooling water 11 in the internal space of the pressurized tank 10 to maintain the first cooling water 11 in a pressurized state in a predetermined pressure.

Meanwhile, a first safety valve 15 may be installed on an outer side of the pressurizing tank 10. In this case, the first safety valve 15 may be configured to be automatically opened when the pressure inside the pressurizing tank 10 reaches a predetermined pressure. For example, the first safety valve 15 may be formed as a spring loaded valve. At this time, the operating pressure of the first safety valve 15 is characteristically set lower than the opening setting of the safety valve installed in the main steam pipe. The opening of the first safety valve 15 related thereto will also be described in detail through the corresponding part.

The steam generator accident mitigation system 1 according to one embodiment of the present invention may comprise a connecting pipe 30 connecting the steam generator 50 and the pressurizing tank 10. In this case, the connecting pipe 30 may extend from one side of the steam generator 50 or the main steam pipe 60 to one side of the pressurizing tank 10, and a space may be formed for fluid to flow inside the connecting pipe 30. In one embodiment of the present invention, the steam generator 50 and the pressurizing tank 10 may be connected each other through a first connecting pipe 31 and a second connecting pipe 33. However, it is noted that the configuration of the connecting pipe 30 is not limited thereto and may include a single connecting pipe 30 as shown in FIGS. 2 and 3, or may include a plurality of three or more connecting pipes 30.

In this case, referring to FIG. 1 again, the first connecting pipe 31 may be installed higher than the second connecting pipe 33 based on the direction perpendicular to the ground. More particularly, when, based on the water surface formed by the second cooling water 51 in the steam generator 50 during normal operation, above the water surface is defined as the upper portion of the steam generator 50 and below the water surface is defined as the lower portion of the steam generator 50, one end of the first connecting pipe 31 to the steam generator 50 may be installed on the upper portion of the steam generator 50 where steam 53 is present and the other end of the first connecting pipe 31 to the pressurizing tank 10 may be installed adjacent to the part where the first cooling water 11 of the pressurizing tank 10 is present. Therefore, when the first connecting pipe 31 is open, the steam 53 generated from the steam generator 50 or the first cooling water 11 inside the pressurizing tank 10 may be able to flow through the first connecting pipe 31.

In the meantime, one end of the first connecting pipe 31 to the steam generator 50 may, as needed, be connected not only to the upper portion of the steam generator 50 but also to the main steam pipe 60 connected to the steam generator 50 as shown in FIG. 2. As such, even if the first connecting pipe 31 is connected to the main steam pipe 60 it may perform the same function as it is connected to the steam generator 50. With this, the steam generator accident mitigation system 1 according to one embodiment of the present invention will achieve the same effect by connecting the first connecting pipe 31 to the main steam pipe 60 even when it is not easy to connect the first connecting pipe 31 to the steam generator 50.

In addition, in one embodiment of the present invention, one end of the second connecting pipe 33 to the steam generator 50 may be installed on the lower portion of the steam generator 50 where the second cooling water 51 is present, and the other end of the second connecting pipe 33 may be installed on the part where the first cooling water 11 of the pressurizing tank 10 is present, the same as for the first connecting pipe 31. Therefore, when the second connecting pipe 33 is open, the second cooling water 51 inside the steam generator 50 or the first cooling water 11 inside the pressurizing tank 10 may be able to flow through the second connecting pipe 33.

Meanwhile, connecting pipe valves 32 and 34 may be installed in the connecting pipe 30. In this case, the connecting pipe valves 32 and 34 may control the amount of opening of the connecting pipe 30, and the steam generator 50 and the pressurizing tank 10 may be connected such that they are capable of fluid communication each other through opening of the connecting pipe valves 32 and 34. For example, the connecting pipe valves 32 and 34 may be formed as an air operated valve, a battery-powered motor operated valve, or a solenoid valve. However, the type of the valve is not limited to these.

In addition, in one embodiment of the present invention, the capacity of the connecting pipe valves 32 and 34 may be up to 5% of the full power steam amount of the steam generator 50. This is only the optimum capacity calculated considering that the amount of steam generated in the steam generator 50 after the reactor trip is around 5% of the full power steam amount, and the capacity of the connecting pipe valves 32 and 34 is not limited to this. That is, it is noted that the capacity of the connecting pipe valves 32 and 34 may be appropriately changed in consideration of other factors such as the capacity of the nuclear reactor 70 and the steam generator, and the design safety factor.

In addition, the connecting pipe valves 32 and 34 may be configured to be manually operated by an operator in the event of an accident. For example, the connecting pipe valves 32 and 34 may remain closed in their normal state, and the connecting pipe valves 32 and 34 may be opened by an operator when an emergency operation procedure entry condition or a severe accident entry condition is reached. This allows the steam 53 or the second cooling water 51 which is a fluid present inside the steam generator 50 to be moved to the pressurizing tank 10, or the first cooling water 11 or the non-condensable gas 13 which is a fluid present inside the pressurizing tank 10 to be moved to the steam generator 50.

Although the steam generator accident mitigation system 1 according to one embodiment of the present invention has been described above on the basis of comprising a plurality of connecting pipes 31 and 33, it is noted as described above that the steam generator accident mitigation system 1 according to one embodiment of the present invention may be formed with only a single connecting pipe as shown in FIGS. 2 and 3. In this case, referring to FIG. 3, one side of the single connecting pipe 31 to the steam generator 50 may be connected to any of the outer parts of the steam generator 50 as required by design, and the other side to the pressurizing tank 10 may be connected to any of the outer parts of the pressurizing tank 10. Hereinafter, a flow of fluid between the steam generator 50 and the pressurizing tank 10 in the event of an accident and a process in which the steam generator accident mitigation system according to one embodiment of the present invention copes with the accident will be described in detail.

Figure 4:
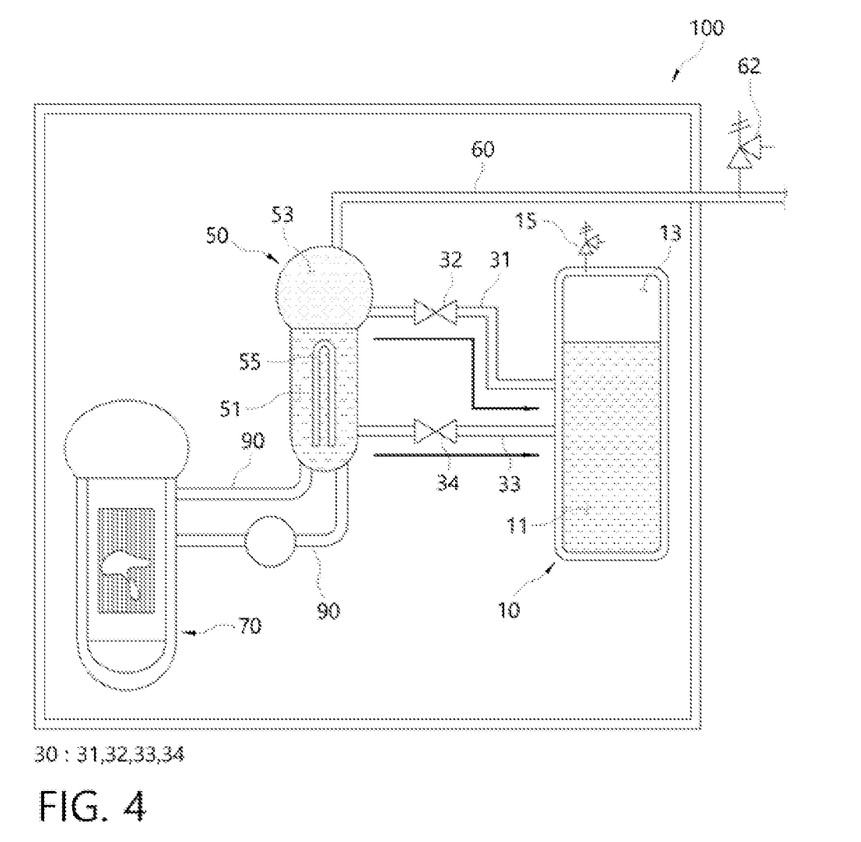
FIG. 4 is a block diagram illustrating a flow of fluid in the event of an accident in which the pressure of a steam generator is increased by a steam generator accident mitigation system according to an exemplary embodiment of the present invention.
Figure 5:
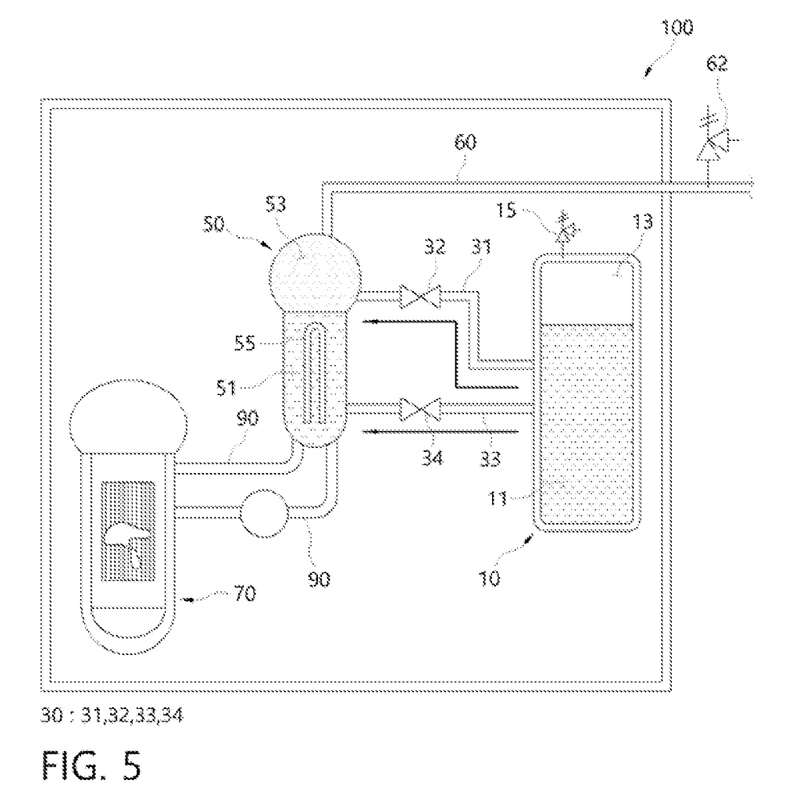
FIG. 5 is a block diagram illustrating a flow of fluid in the event of an accident in which the pressure of a steam generator is decreased by a steam generator accident mitigation system according to an exemplary embodiment of the present invention.

FIG. 4 is a block diagram illustrating a flow of fluid in the event of an accident in which the pressure of a steam generator is increased by a steam generator accident mitigation system according to an exemplary embodiment of the present invention. FIG. 5 is a block diagram illustrating a flow of fluid in the event of an accident in which the pressure of a steam generator is decreased by a steam generator accident mitigation system according to an exemplary embodiment of the present invention.

First, in the event of an accident in which the pressure inside the steam generator 50 increases, such as an accident in which the tube 55 of the steam generator 50 is ruptured, the connecting pipe valve 32 or 34 of the first connecting pipe 31 or the second connecting pipe 33 may be opened. In this case, referring to FIG. 4, since the pressure inside the steam generator 50 may be greater than the pressure inside the pressurizing tank 10, the second cooling water 51 or the steam 53 may be moved from the steam generator 50 to the pressurizing tank 10 due to the pressure difference. This may reduce the pressure of the steam 53 inside the steam generator 50. As a result, the steam 53 moved from the steam generator through the main steam pipe 60 may prevent or delay the main steam pipe safety valve 62 from being operated and stuck open.

In contrast, referring to FIG. 5, if the pressure inside the steam generator 50 is unexpectedly lowered due to malfunction by an operator, etc., opening of the connecting pipe valve 32 or 34 of the first connecting pipe 31 or the second connecting pipe 33 may cause the first cooling water 11 to move from the pressurizing tank 10 to the steam generator 50. That is, with this, if the tube of the steam generator is already ruptured, a liquid such as the first cooling water 11 is supplied to the inside of the steam generator, thereby trapping radioactive materials to minimize the amount of radioactive materials released to the atmosphere in the form of aerosol or gas.

Figure 6:
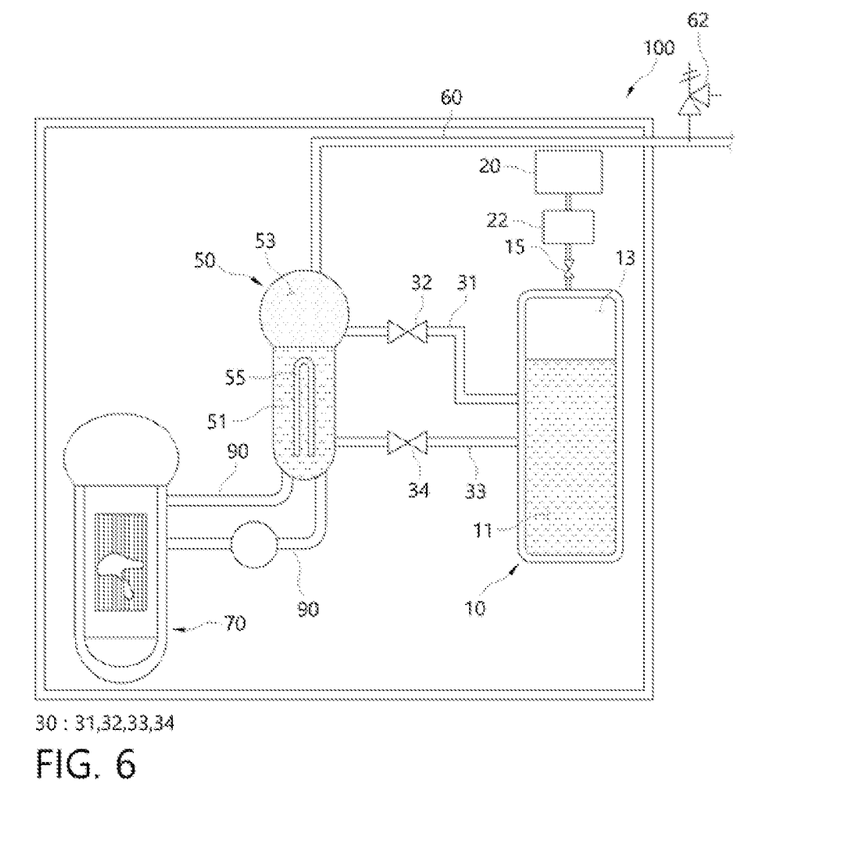
FIG. 6 is a block diagram illustrating a steam generator accident mitigation system releasing fluid into an enclosed space located inside a containment building of a nuclear power plant according to an exemplary embodiment of the present invention.

FIG. 6 is a block diagram illustrating a steam generator accident mitigation system releasing fluid into an enclosed space located inside a containment building of a nuclear power plant according to an exemplary embodiment of the present invention. As already discussed, in one embodiment of the present invention, if more than a certain amount of steam 53 is moved from the steam generator 50 to the pressurizing tank 10, the first safety valve 15 of the pressurizing tank 10 may be opened. At this time, at least some of the steam 53 introduced into the pressurizing tank 10 from the steam generator 50 may be released into the space inside the containment building 100 through the first safety valve 15.

Therefore, the steam generator accident mitigation system 1 according to one embodiment of the present invention may advantageously release the steam 53 potentially containing a large amount of radioactive materials into a limited space inside the containment building, unlike the main steam pipe safety valve 62 that releases the steam 53 directly into the atmosphere. In this case, the first safety valve 15 may be preferably configured to release the steam 53 at a pressure lower than the pressure of the main steam pipe safety valve 62 since the first safety valve 15 should be opened before the main steam pipe safety valve 62 to prevent the steam 53 being released into the atmosphere through the main steam pipe safety valve 62. That is, the operating pressure of the first safety valve 15 may be preferably lower than the pressure of the main steam pipe safety valve 62. Meanwhile, the first safety valve is not limited to a spring type valve, but various types of valves that can be automatically opened at a set pressure lower than the opening setting of the safety valve of the steam generator may be used.

In the meantime, in one embodiment of the present invention, referring to FIG. 6, the steam 53 released through the first safety valve 15 may be moved through a passive autocatalytic recombiner 22 into a separate enclosed space 20 located inside the containment building 100. In this case, the passive autocatalytic recombiner (PAR) is a device for effectively removing hydrogen that can be contained in a steam 53 released through the first safety valve 15, and the hydrogen can be removed by chemical reaction. For example, as the released steam 53 passes through a surface of a metal plate of the autocatalytic recombiner, hydrogen ($H_2$) and oxygen ($O_2$) may come into contact with each other, having chemical reaction to generate water vapor and heat. This may secure safety of the containment building 100 by preventing hydrogen explosion that may occur due to a rapid increase in the hydrogen concentration within the enclosed space 20.

Although exemplary embodiments of the present invention have been described above, the spirit of the present invention is not limited to the embodiments set forth herein. Those of ordinary skill in the art who understand the spirit of the present invention may easily propose other embodiments through supplement, change, removal, addition, etc. of elements within the same spirit, but the embodiments will be also within the scope of the present invention.

EXPLANATION OF REFERENCE NUMERALS 1 steam generator accident mitigation system
10 pressurizing tank
11 first cooling water
13 non-condensable gas
15 first safety valve
20 enclosed space
22 passive autocatalytic recombiner
30 connecting pipe
31 first connecting pipe
32, 34 connecting pipe valve
33 second pipe
50 steam generator
51 second cooling water
53 steam
55 steam generator tube
60 main steam pipe
62 main steam pipe safety valve
70 nuclear reactor
90 cooling system
100 containment building

The invention claimed is:

1. A steam generator accident mitigation system to mitigate an accident occurring in a steam generator of a nuclear power plant, which comprises the steam generator installed inside a containment building of the nuclear power plant and a main steam pipe having one end connected to the steam generator and the other end positioned outside the containment building, the system comprising:
   a pressurizing tank inside the containment building and configured to store a first cooling water and a non-condensable gas for pressurizing the first cooling water therein;
   a first connecting pipe connecting the steam generator and the pressurizing tank; and
   a first connecting pipe valve in the first connecting pipe, and configured to control an amount of opening of the first connecting pipe,
   wherein when the first connecting pipe valve is opened, the first connecting pipe is configured to allow a movement of fluid from the steam generator to the pressurized tank or from the pressurized tank toward the steam generator according to a pressure inside the steam generator,
   wherein one end of the first connecting pipe to the pressurizing is installed adjacent to a part where the first cooling water of the pressurizing tank is present,
   wherein the pressure inside the steam generator increases due to the accident, the first connecting pipe is configured to move a second cooling water or the steam of the steam generator from the steam generator to the pressurizing tank by a pressure difference, and
   wherein the pressure inside the steam generator suddenly decreases, the first connecting pipe is configured to move the first cooling water from the pressurizing tank to the steam generator by a pressure difference.

2. The steam generator accident mitigation system of claim 1, further comprising:
a second connecting pipe connecting the steam generator and the pressurizing tank; and
a second connecting pipe valve in the second connecting pipe, and configured to control an amount of opening of the second connecting pipe,
wherein the first connecting pipe is installed on an upper portion of the steam generator, and is configured to allow the first cooling water in the pressurizing tank or steam generated from the steam generator to flow therethrough, and
wherein the second connecting pipe is installed below the first connecting pipe, and is configured to allow the first cooling water in the pressurizing tank or the second cooling water in the steam generator to flow therethrough.

3. The steam generator accident mitigation system of claim 1, further comprising:
a first safety valve installed on one side of an outside of the pressurizing tank,
wherein the first safety valve is configured to release at least some of the steam introduced from the steam generator into the pressurizing tank into a space inside the containment building.

4. The steam generator accident mitigation system of claim 3, wherein the steam generator accident mitigation system is configured to set an operating pressure of the first safety valve to be lower than an operating pressure of a main steam safety valve installed in the main steam pipe connecting the steam generator and a turbine.

5. The steam generator accident mitigation system of claim 1, wherein the first connecting pipe valve is configured to be operated manually.

* * * * *